United States Patent
Sinha et al.

(10) Patent No.: US 10,079,890 B2
(45) Date of Patent: Sep. 18, 2018

(54) SYSTEM AND METHOD ESTABLISHING AN ADHOC NETWORK FOR ENABLING BROADCASTING

(71) Applicant: Tata Consultancy Services Limited, Maharashtra (IN)

(72) Inventors: Aniruddha Sinha, West Bengal (IN); Arpan Pal, West Bengal (IN); Dhiman Chattopadhyay, West Bengal (IN)

(73) Assignee: TATA CONSULTANCY SERVICES LIMITED (IN)

( * ) Notice: Subject to any disclaimer, the term of this patent is extended or adjusted under 35 U.S.C. 154(b) by 916 days.

(21) Appl. No.: 14/363,378

(22) PCT Filed: Dec. 4, 2012

(86) PCT No.: PCT/IN2012/000791
§ 371 (c)(1),
(2) Date: Jun. 6, 2014

(87) PCT Pub. No.: WO2013/098849
PCT Pub. Date: Jul. 4, 2013

(65) Prior Publication Data
US 2014/0362733 A1    Dec. 11, 2014

(30) Foreign Application Priority Data

Dec. 7, 2011    (IN) .......................... 3437/MUM/2011

(51) Int. Cl.
*H04L 29/08*    (2006.01)
*H04W 4/80*    (2018.01)
(Continued)

(52) U.S. Cl.
CPC .......... *H04L 67/12* (2013.01); *H04L 63/0421* (2013.01); *H04W 4/023* (2013.01); *H04W 4/06* (2013.01); *H04W 4/80* (2018.02); *H04W 48/10* (2013.01); *H04W 12/02* (2013.01); *H04W 84/18* (2013.01)

(58) Field of Classification Search
USPC ....................................................... 370/254
See application file for complete search history.

(56) References Cited

U.S. PATENT DOCUMENTS 8,094,007 B2    1/2012    Hinkson et al.
8,150,416 B2    4/2012    Ribaudo et al.
(Continued)

OTHER PUBLICATIONS

Waylon Brunette, Carl Hartung, Ben Nordstrom, Gaetano Borriello, Sep. 19, 2003, Department of Computer Science and Engineering,University of Washington, Proximity Interactions between Wireless Sensors and their Application, 8 pages.
(Continued)

*Primary Examiner* — Alpus H Hsu
*Assistant Examiner* — Hooman Houshmand
(74) *Attorney, Agent, or Firm* — Hayes Soloway P.C.

(57) ABSTRACT

A system and method for dynamically establishing an adhoc network amongst plurality of communication devices in a beyond audible frequency range is disclosed. The system comprises a first communication device to transmit a quantity of data to a second communication device. The first communication device comprises of an input capturing module to receive the quantity of data from a broadcaster in a format and converts the quantity of data received into a quantity of modulated data, an identity generating module to generate a temporary identity for a broadcasting user. The second communication device then receives the data broadcasted from the first communication device and determines a probabilistic confidence level of the quantity of modulated (Continued)

data. A transreceiver implemented in the first communication device and second communication device transmits and receives the quantity of data in conjugation with the temporary identity within a predefined proximity of each device.

15 Claims, 4 Drawing Sheets

(51) Int. Cl.
H04W 48/10 (2009.01)
H04L 29/06 (2006.01)
H04W 4/02 (2018.01)
H04W 4/06 (2009.01)
H04W 84/18 (2009.01)
H04W 12/02 (2009.01)

(56) References Cited

U.S. PATENT DOCUMENTS

| | | | |
|---|---|---|---|
| 8,661,515 B2 | 1/2014 | Meylemans et al. | |
| 8,743,823 B2 | 6/2014 | Richardson et al. | |
| 2003/0055655 A1* | 3/2003 | Suominen | G10L 15/22 704/276 |
| 2004/0133428 A1* | 7/2004 | Brittan | G06F 9/5044 704/276 |
| 2005/0049732 A1* | 3/2005 | Kanevsky | H04B 11/00 700/94 |
| 2005/0174975 A1* | 8/2005 | Mgrdechian | G06Q 30/0207 370/338 |
| 2006/0146765 A1* | 7/2006 | Van De Sluis | G06F 3/016 370/338 |
| 2007/0288467 A1* | 12/2007 | Strassner | H04L 41/0226 |
| 2008/0070656 A1* | 3/2008 | Somuah | A63F 9/183 463/9 |
| 2010/0030838 A1* | 2/2010 | Atsmon | A63H 3/28 709/200 |
| 2011/0090837 A1* | 4/2011 | Duchscher | H04L 1/0057 370/312 |
| 2011/0264453 A1 | 10/2011 | Brokken et al. | |

OTHER PUBLICATIONS

FCC OET laboratory Division ,"RF Exposure procedure updates", Apr. 2011, 32 pages.

* cited by examiner

SYSTEM AND METHOD ESTABLISHING AN ADHOC NETWORK FOR ENABLING BROADCASTING

CROSS REFERENCE TO RELATED APPLICATION

The present application claims priority from an Indian Patent application number 3437/MUM/2011 filed on Dec. 7, 2011.

FIELD OF THE DISCLOSURE

The present disclosure relates to a short distance communication amongst wireless communication devices. More particularly, the disclosure relates to a system and method for establishing an adhoc network among plurality of communication devices.

BACKGROUND OF THE DISCLOSURE

Mobile communication has altered our social and professional interaction. Mobile communication devices are perceived as one stop solution to our digital requirements. Accordingly, the devices have been adapted to perform plurality of functions of communication. A typical communication happens over microwave frequency. To resolve problem with data and information transmission in a close proximity, a Bluetooth and other related technologies have been very effective. These communication devices are further adapted to support voice, text and video data sharing to maximum eight devices within a predetermined proximity. Through wireless communication, data can be shared for short as well as for long distances. Mobile communication networks connect via satellite for using the wireless technology.

Presently available communication devices share the data by using applications like Bluetooth, infra-red, etc. For sharing the data via Bluetooth, each communication device needs to have the appropriate application as well as the basic Bluetooth communication capability. Bluetooth supports data exchange over short range distances by using short wavelength radio transmissions in the ISM band from 2400-2480 MHz. Also, the mobile communication users need to be paired up while sharing the data. Bluetooth creates a mini network where maximum eight devices can share the data among each other.

Similarly, other widely used technologies are ZigBee, Internet, etc. but they lack in spontaneity and are not able to auto identify a group of interest. For most of the methods like use of Bluetooth, infra-red applications, etc., communication devices should be paired for exchanging data. Also for most of the techniques, additional hardware components (like server) are required to support data transmission and receiving. Many of the present systems consume a huge amount of energy in terms of bandwidth consumption. Also, a complex network has to be a created for sharing the data between large numbers of communication devices.

Thus, a heretofore unaddressed need exists in the industry to address the aforementioned deficiencies and inadequacies.

OBJECTS OF THE DISCLOSURE

It is the primary of the disclosure to provide a system establishing an adhoc network amongst multiple communication devices.

It is another object of the disclosure to communicate between multiple devices by converting data into beyond audible frequency range.

It is yet another object of the disclosure to generate a temporary identity of the broadcasting user for preserving anonymity.

It is yet another object of the disclosure to derive a confidence level for the modulated data received from the plurality of communication devices.

It is yet another object of the disclosure to provide a system for scheduling data transmission at a preset time and location.

It is yet another object of the disclosure to provide a system for detecting preexisting signals before activating data transmission.

SUMMARY OF THE DISCLOSURE

In one implementation, a system for dynamically establishing an adhoc network amongst plurality of communication devices in a beyond audible frequency range is disclosed. The system comprises a first communication device to transmit a quantity of data to a second communication device. The first communication device further comprises an input capturing module to receive the quantity of data from a broadcaster in a format and converts the quantity of data received into a quantity of modulated data. The first communication device comprises an identity generating module to generate a temporary identity for a broadcasting user. The system further comprises the second communication device to receive the quantity of data broadcasted from the first communication device. The second communication devices further comprises a confidence generation module to determine a probabilistic confidence level of the quantity of modulated data. The system further comprises a transreceiver implemented in the first communication device and second communication device. The transreceiver transmits and receives the quantity of data in conjugation with the temporary identity within a predefined proximity of the first communication device and the second communication device.

In one implementation, a method for dynamically establishing an adhoc network amongst plurality of communication devices in a beyond audible frequency range is disclosed. The method comprises receiving from a broadcasting user a quantity of data into a first communication device in a format and converting the quantity of data received into a quantity of modulated data within the first communication device. The method further comprises generating a temporary identity for the broadcasting user and transmitting the quantity of modulated data in conjugation with the temporary identity generated to a second communication devices among users in proximity thereof the broadcasting users.

In one implementation, a method for dynamically establishing an adhoc network amongst plurality of communication devices in a beyond audible frequency range is disclosed. The method comprises receiving a quantity of modulated data and a temporary identity of one or more broadcasting users from a first communication device into a second communication device. The method further comprises converting the quantity of modulated data into an audible frequency range to obtain a demodulated data in the second communication device. The method further comprises evaluating a probabilistic confidence level of the quantity of data received from the first communication device. The method further comprises rendering the demodulated data in an ascending order of the probabilistic confidence level of the quantity of data received onto the second communication device for each of the receiving users.

DETAILED DESCRIPTION OF THE DISCLOSURE

Some embodiments of this disclosure, illustrating its features, will now be discussed:

The words "comprising", "having", "containing", and "including", and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a", "an", and "the" include plural references unless the context clearly dictates otherwise. Although any systems, methods, apparatuses, and devices similar or equivalent to those described herein can be used in the practice or testing of embodiments of the present disclosure, the preferred, systems and parts are now described. In the following description for the purpose of explanation and understanding reference has been made to numerous embodiments for which the intent is not to limit the scope of the disclosure.

One or more components of the disclosure are described as module for the understanding of the specification. For example, a module may include self-contained component in a hardware circuit comprising of logical gate, semiconductor device, integrated circuits or any other discrete component. The module may also be a part of any software programme executed by any hardware entity for example processor. The implementation of module as a software programme may include a set of logical instructions to be executed by the processor or any other hardware entity. Further a module may be incorporated with the set of instructions or a programme by means of an interface.

The disclosed embodiments are merely exemplary of the disclosure, which may be embodied in various forms.

The present disclosure provides a system and method for dynamically establishing an adhoc network amongst plurality of communication devices. The quantity of data is received onto one or more communication devices in a specific format and is converted into beyond audible frequency range. The quantity of data is transmitted to a plurality of communication devices thus creating an adhoc network.

Figure 1:
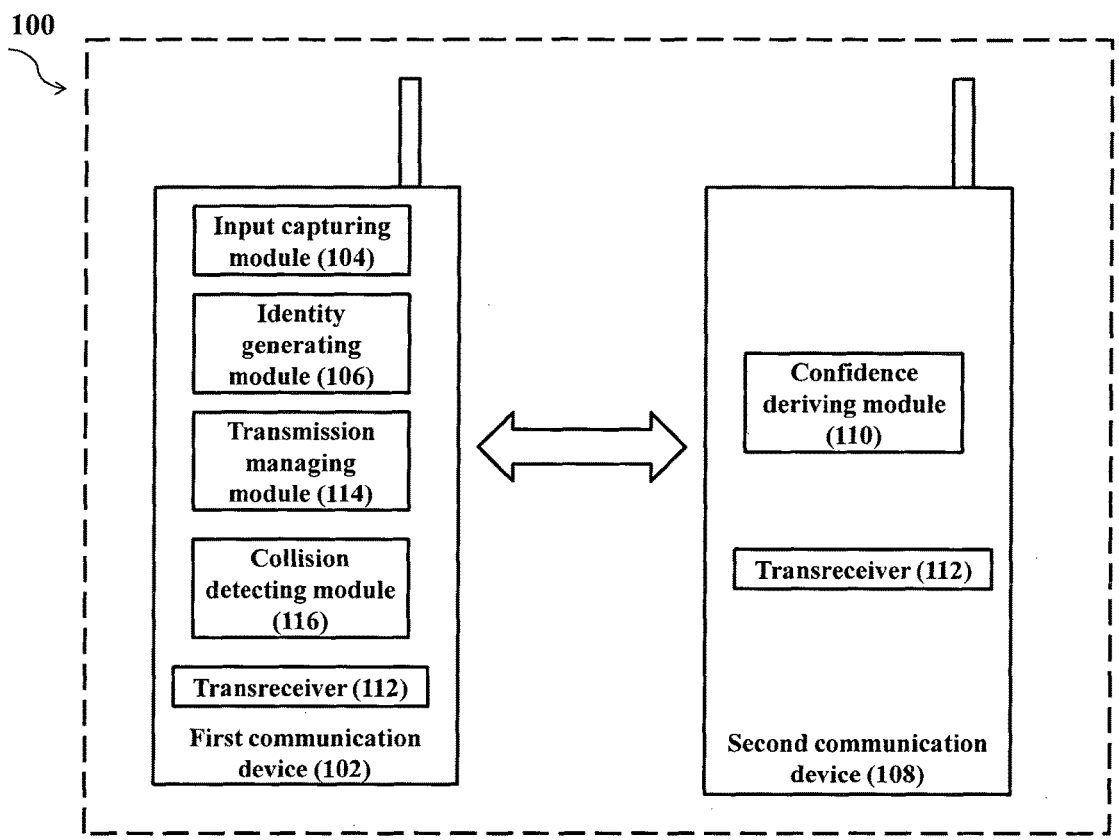
FIG. 1 illustrates the system architecture in accordance with an embodiment of the disclosure.

In accordance with en embodiment, referring to FIG. 1, the system (100) comprises of a first communication device (102) configured for transmitting data/quantity of data onto plurality of communication devices. The first communication device (102) further comprises of an input capturing module (104) configured for receiving input from one or more broadcasting users. The first communication device further comprises of an identity generating module (106) for generating a temporary identity for the broadcasting user.

The system (100) may include a variety of computerized and computer-compatible hardware and software components. For example, the system (100) may include a processor, an input/output (I/O) interface, and a memory. The processor may be implemented as one or more microprocessors, microcomputers, microcontrollers, digital signal processors, central processing units, state machines, logic circuitries, and/or any devices that manipulate signals based on operational instructions. Among other capabilities, the processor is configured to fetch and execute computer-readable instructions stored in the memory.

The I/O interface may include a variety of software and hardware interfaces, for example, a web interface, a graphical user interface, and the like. The I/O interface may allow the system (100) to interact with a user directly or through the user devices (102). Further, the I/O interface may enable the system (100) to communicate with other computing devices, such as web servers and external data servers. The I/O interface may facilitate multiple communications within a wide variety of networks and protocol types, including wired networks, for example, LAN, cable, etc., and wireless networks, such as WLAN, cellular, or satellite. The I/O interface may include one or more ports for connecting a number of devices to one another or to another server.

The memory may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory may include modules and system data. The modules include routines, programs, objects, components, data structures, etc., which perform particular tasks or implement particular abstract data types. In one implementation, the modules may include a reception module, a displaying module, and other modules. The other modules may include programs or coded instructions that supplement applications and functions of the system.

Figure 2:
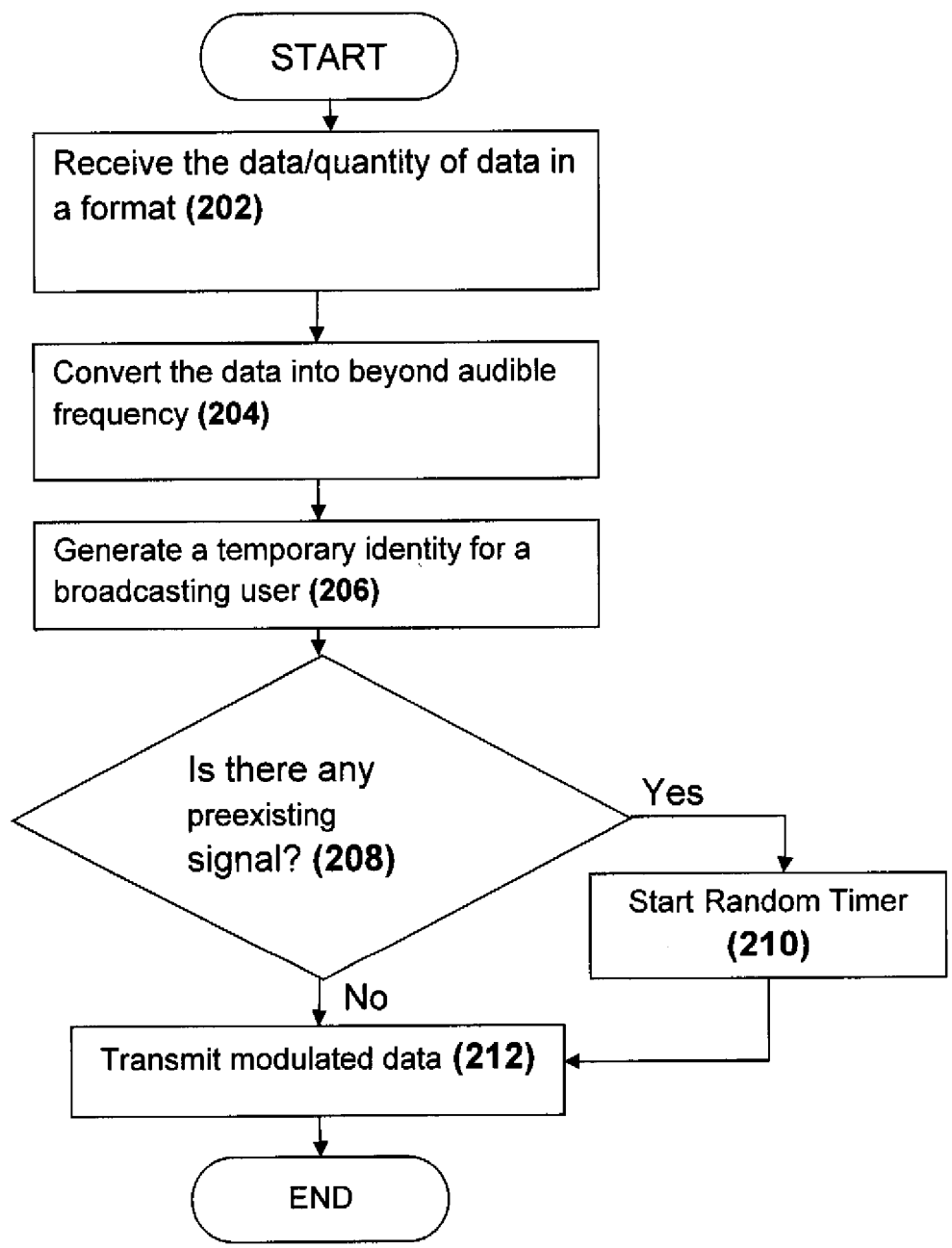
FIG. 2 illustrates an exemplary flowchart for transmission of data in accordance with an embodiment of the disclosure.

Referring to FIG. 2, as shown in step (202), the broadcasting user of the first communication device (102) may receive the data/quantity of data in a particular format onto the first communication device (102) through the input capturing module (104). The data/quantity of data may include and is not limited to text data, voice data or a combination thereof. After the data/quantity of data is received, the first communication device (102) may convert the data/quantity of data into a modulated data/quantity of modulated data as shown in step (204) of FIG. 2.

By way of specific example, the modulated data/quantity of modulated data may include data in beyond audible frequency range. The beyond audible frequency may be above 16 kHz and the upper range may be limited by the microphone and at least one speaker available in the communication devices. The audible frequency range may be dependent on one or more components of the communication device. For example, microphone and speaker may have different audible frequency range for different communication devices.

In accordance with an embodiment, the first communication device (102) further comprises of a plurality of converters for example, text to speech converter and speech to text converter. By way of the converters, the format of data/quantity of data may be changed. The speech data may be converted into text data or text data may be converted into speech data.

Still referring to FIG. 2, as shown in step (206), the first communication device (102) further comprises of an identity generating module (106) for generating a temporary identity for the broadcasting user of the first communication device (102). The temporary identity may be generated by using one or more input parameters. The one or more input parameters comprise of an identity of the first communication device (102), time stamp when the transmission session is started, a unique parameter of the first communication device (102) such as battery meter, memory usage or a combination thereof. The temporary identity may preserve anonymity of the identity of the first communication device (102).

When the data/quantity of data is converted into the modulated data/quantity of modulated data and the temporary identity is generated, the first communication device may start the transmission of the modulated data/quantity of modulated data to a plurality of communication devices in its proximity through the transreceiver (112).

In accordance with an embodiment, referring to FIG. 1, the first communication device (102) further comprises of a collision detecting module (116) configured to detect one or more preexisting signals before ensuing transmission of the modulated data/quantity of modulated data to a plurality of communication devices. As shown in step (208) of FIG. 2, the collision detecting module (116) may check for any existing signal in a particular frequency range for example, beyond the audible frequency range before activating its own. If there is no such signal, the first communication device (102) may start transmitting the modulated data/quantity of modulated data as shown in step (212) of FIG. 2. While transmitting the modulated data/quantity of modulated data, if any other signal is detected then the transmission may be stopped and the transreceiver (112) may go into sleep mode and the transreceiver may activate a random timer as shown in step (210) of FIG. 2. When the collision detecting module (116) detects the end of the transmission of the existing signal, the collision detecting module (116) may end the random timer and may enable/restart the transreceiver (112) to start the transmission of the modulated data/quantity of modulated data.

In accordance with an embodiment, the first communication device (102) further comprises of a transmission managing module (114) configured for scheduling the data transmission at a preset time, location or a combination thereof. By way of specific example, the broadcasting user may schedule the transmission of a text message regarding meeting at his office (preset location) at 9am (preset time). When the user reaches the office at 9am, the text message may be transmitted to the plurality of communication devices in its proximity.

In accordance with an embodiment, referring to FIG. 1, the system (100) further comprises of a one or more second communication devices (108) configured to receive the broadcasted data from the first communication devices (102) in its proximity. The second communication device (108) may receive the data/quantity of data through the transreceiver (112).

Figure 3:
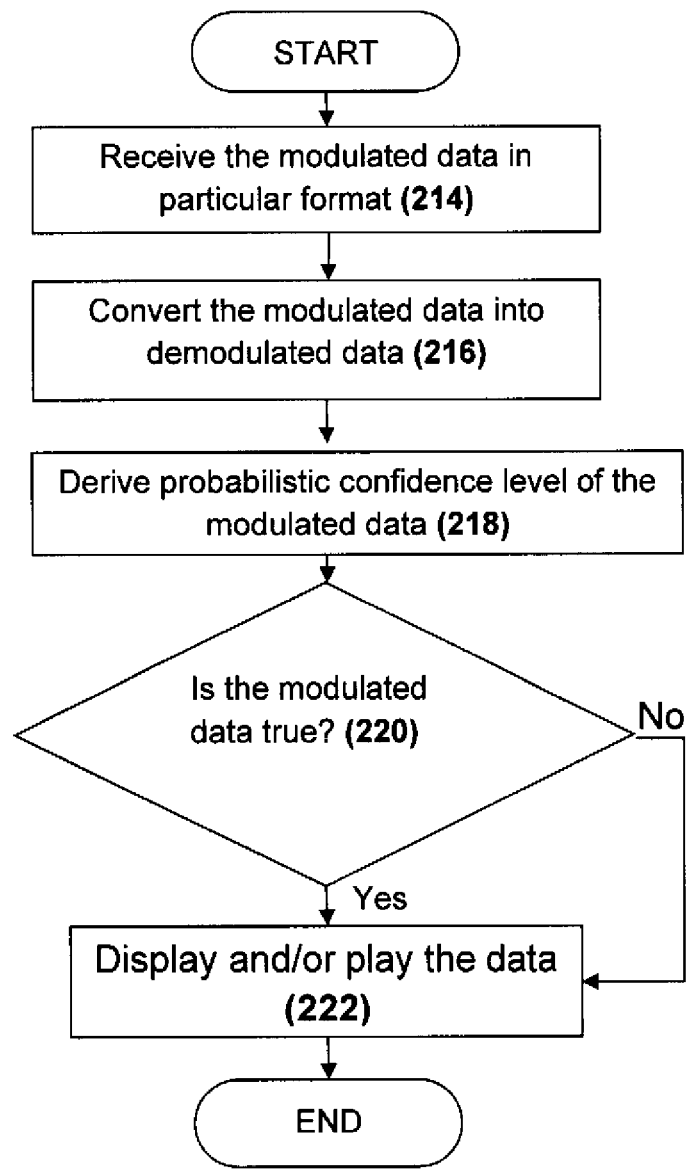
FIG. 3 illustrates another exemplary flowchart for receiving the data in accordance with an alternate embodiment of the disclosure.

Referring to FIG. 3 as shown in step (214), the second communication device (108) may receive the modulated data/quantity of modulated data in conjugation with the temporary identity generated for the first communication device (102). The received modulated data/quantity of modulated data is in a particular format. The second communication device (108) may further comprise a plurality of converters to convert the modulated data/quantity of modulated data from one format to other. For example, the converter may include and is not limited to the text to speech converter, the speech to text converter or a combination thereof. Also, the modulated data/quantity of modulated data may again be converted into a demodulated data as shown in step (216) of FIG. 3.

The second communication device (108) may receive the data/quantity of data from the plurality of first communication devices (102) in its proximity. The second communication device (108) further comprises of a confidence deriving module (110) configured to determine a probabilistic confidence level of the modulated data/quantity of modulated data received from the plurality of first communication devices (102) as shown in step (218) of FIG. 3. The determination of confidence level is based on semantic analysis and may be a function of similar information received from the plurality of first communication devices (102). If similar information is shared by multiple communication devices (102), then the confidence deriving module (110) may build up a confidence on the truth of the information and may then depict the confidence level to the user of the second communication device (108).

As shown in step (220) and (222) of FIG. 3, if the data/quantity of data received is true, the second communication device (108) may play the message if it is in an audible form or may display the message if it is in a text form. Also, the second communication device (108) may change the format of the message.

Figure 4:
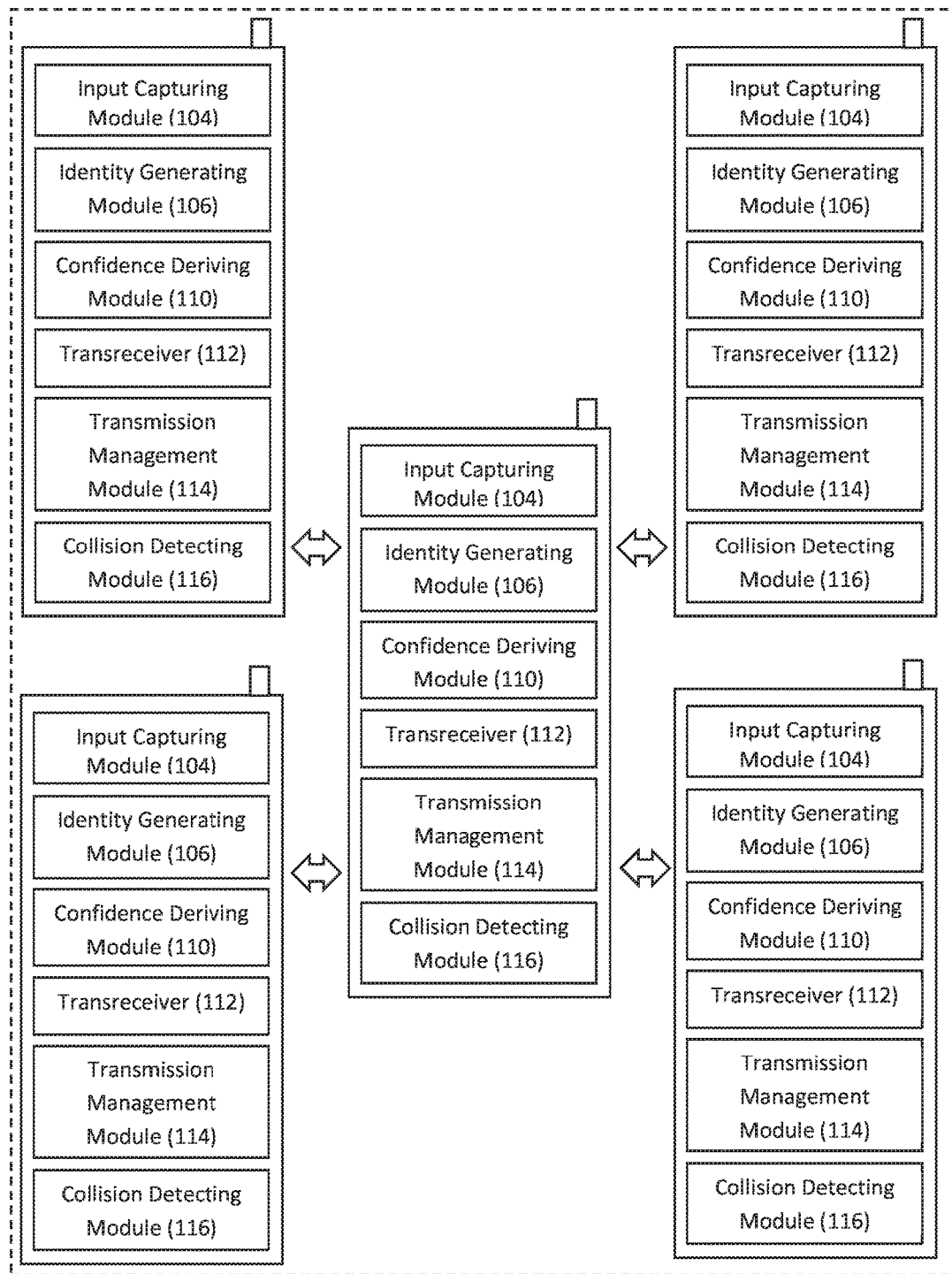
FIG. 4 illustrates the adhoc network in accordance with an exemplary embodiment of the disclosure.

In accordance with an embodiment, FIG. 4 shows an adhoc network for broadcasting data. Any of the communication devices (the first communication device and/or the second communication device) may transmit and/or receive the data/quantity of data from each other thus creating an adhoc network. The first communication device (102) may also include the confidence deriving module (110) and may receive the data/quantity of data from the plurality of communication devices. Similarly, the second communication device may also include the input capturing module (104), the identity generating module (106), the collision detecting module (116) and the transmission managing module (114) for transmitting the data//quantity of data to a plurality of communication devices in its proximity. Any of the communication devices (the first communication device or the second communication device) may transmit or receive the data/quantity of data to the plurality of communication devices by using one or more module configured for transmission and receiving the data/quantity of data.

BEST MODE/EXAMPLE FOR WORKING OF THE DISCLOSURE

The process illustrated for a data broadcast in the above paragraph can be supported by a working example showed in the following paragraph; the process is not restricted to the said example only:

A user needs the feedback of a new restaurant in the town. He types and transmits a message through his mobile communication device to get the feedback from the people taking food at that restaurant. Plurality of persons (for example, 5) replies him and provides their feedback thus creating an adhoc network where members can interact as in a social network. Out of the 5 messages, 4 messages provide positive feedback and 1 message provides negative feedback. Based on the confidence level of the messages received, the user may come to know about the restaurant and about the quality of a particular food.

We claim:

1. A system for dynamically establishing an adhoc network amongst plurality of communication devices in a beyond-audible frequency range, the system comprising:
   a plurality of first communication devices configured to transmit a quantity of data to a second communication device, wherein each of the plurality of first communication devices comprises:
      an input capturing module adapted to receive the quantity of data from a broadcaster in a format, wherein the quantity of data received is converted into a quantity of modulated data;
      an identity generator receiving input parameters of the associated one of the plurality of first communication devices and generating a temporary identity for a broadcasting user, wherein the input parameters comprise an identity of the associated one of the plurality of first communication devices, a time stamp when a transmission session is started, and a unique parameter of the associated one of the plurality of first communication devices, and wherein the unique parameter of the associated one of the plurality of first communication device comprises a battery meter and a memory usage;
   the second communication device configured to receive the quantity of data broadcasted from the plurality of first communication devices, wherein the second communication device comprises:
      a confidence generator determining a probabilistic confidence level of the quantity of modulated data, wherein the probabilistic confidence level is determined based on a semantic analysis of the quantity of data broadcasted from the plurality of first communication devices as a function of similar information received from the plurality of first communication devices;
   a transceiver implemented in the plurality of first communication devices and the second communication device, wherein the transceivers transmit and receive the quantity of data in conjugation with the temporary identity for the broadcasting user within a predefined proximity of the plurality of first communication devices and the second communication device.

2. The system as claimed in claim 1, wherein the each of the plurality of first communication devices further comprises a transmission managing module configured for scheduling transmission of the quantity of data at a preset time and location.

3. The system as claimed in claim 1, wherein the quantity of modulated data comprises data in the beyond-audible frequency range.

4. The system as claimed in claim 1, wherein the temporary identity of the broadcasting user preserves anonymity of an identity of the associated one of the plurality of first communication devices.

5. The system as claimed in claim 1, wherein each of the plurality of the first communication devices further comprises a collision detecting module configured to detect at least one preexisting signal before ensuing transmission of the quantity of modulated data to the second communication device.

6. The system as claimed in claim 5, wherein a random timer is activated upon detection of the at least one preexisting signal, wherein transmission of the quantity of modulated data is ceased during activation of the random timer.

7. The system as claimed in claim 1, wherein the format of the quantity of data received in the input capturing module includes at least one of a text data and a voice data.

8. The system as claimed in claim 1, wherein the beyond-audible frequency is above 16 KHz and an upper range is limited by a microphone and at least one speaker available in each of the plurality of first communication devices and the second communication device.

9. The system as claimed in claim 1, wherein the input capturing module further comprises at least one of a text to speech converter and a speech to text converter.

10. A method for dynamically establishing an adhoc network amongst plurality of communication devices in a beyond-audible frequency range, the method comprising steps of:
   receiving a quantity of modulated data and a temporary identity of a broadcasting user from a plurality of first communication devices into a second communication device, wherein the temporary identity is generated based on: an identity of the associated one of the plurality of first communication devices, a time stamp when a transmission session is started, and a unique parameter of the associated one of the plurality of first communication devices, and wherein the unique parameter of the associated one of the plurality of first communication device comprises a battery meter and a memory usage;
   converting the quantity of modulated data into an audible frequency range to obtain a demodulated data within the second communication device;
   evaluating a probabilistic confidence level of the quantity of modulated data received from the plurality of first communication devices, wherein the probabilistic confidence level is determined based on a semantic analysis of the quantity of data broadcasted from the plurality of first communication devices as a function of similar information received from the plurality of first communication devices; and
   rendering the demodulated data in an ascending order of the probabilistic confidence level of the quantity of modulated data received onto the second communication device for each of a plurality of receiving users.

11. The method as claimed in claim 10, further comprising scheduling the quantity of modulated data transmission at a preset time and location.

12. The method as claimed in claim 10, further comprising detecting a preexisting signal before ensuing transmission of the quantity of modulated data to the second communication device.

13. The method as claimed in claim 12, further comprising: activating a random timer upon detection of the preexisting signal; and upon activation of the random timer, placing a transceiver of the plurality of the first communication devices into a sleep mode.

14. The method as claimed in claim 10, wherein the quantity of data further comprises at least one of text data and speech data, wherein the method further comprises the step of at least one of converting text data into speech data and speech data into text data.

15. The method as claimed in claim 10, wherein the quantity of modulated data further comprises at least one of text data and speech data, wherein the method further comprises the step of at least one of converting text data into speech data and speech data into text data.

* * * * *